J. GIBBONS.
Seed Planter.
A. I. No. 43. Patented May 4, 1841.
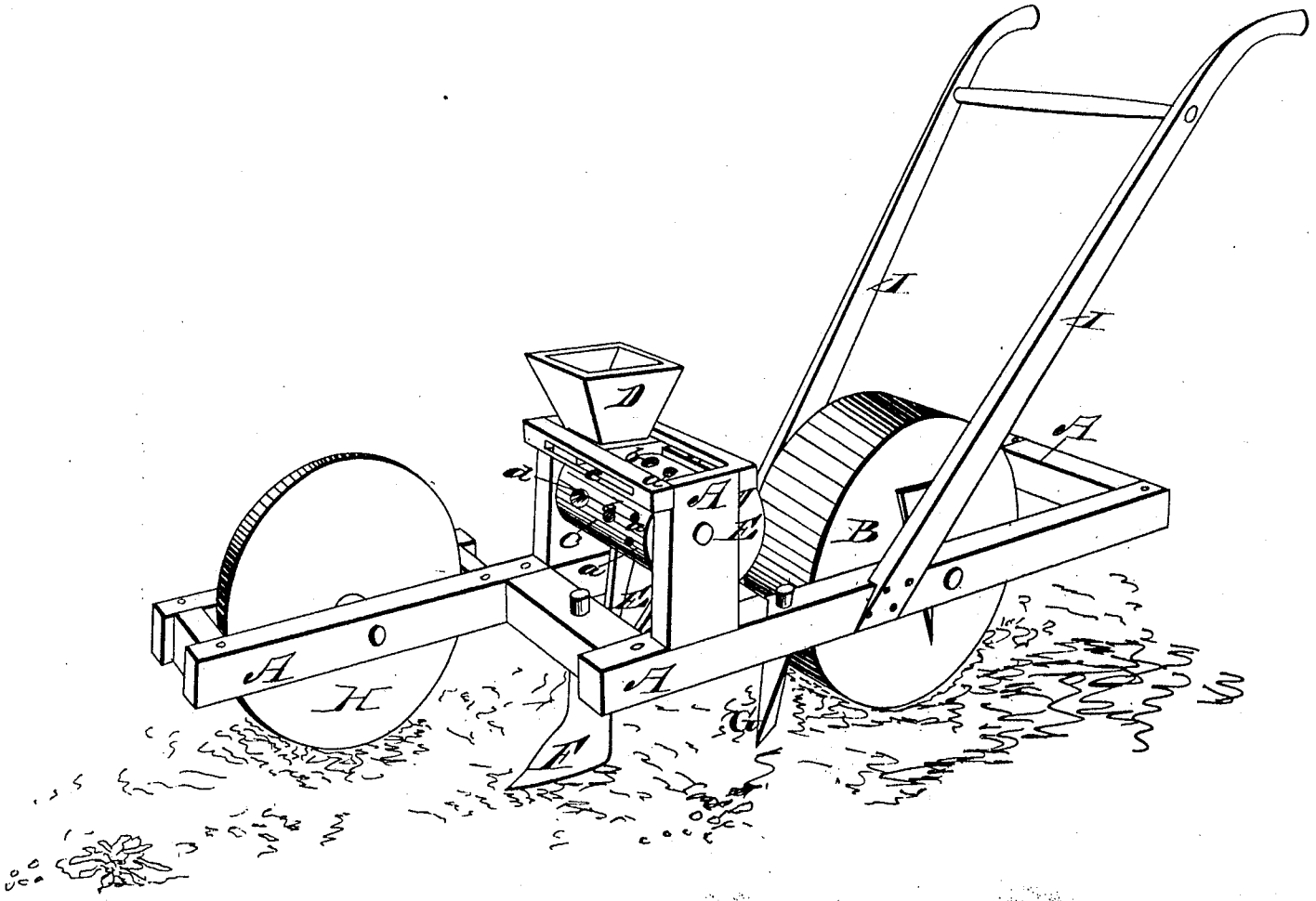
N. PETERS, Photo-Lithographer, Washington, D. C.

UNITED STATES PATENT OFFICE.

JOSEPH GIBBONS, OF ADRIAN, MICHIGAN.

IMPROVEMENT IN THE MACHINE FOR PLANTING OR SOWING SEED, &c.

Specification of Additional Improvement No. 43, dated May 4, 1841, forming a part of Letters Patent No. 1,731, dated August 25, 1840.

*To all whom it may concern:*

Be it known that I, JOSEPH GIBBONS, of Adrian, in the county of Lenawee and State of Michigan, have invented an Improvement in the Manner of Constructing the Machine for the Planting and Sowing of Seeds of Various Kinds, (for which Letters Patent of the United States were granted to me on the 25th day of August, 1840,) which improvement I am desirous to have added to said Letters Patent, and to make a part thereof.

My improvement is intended to be applied to the said machine when it is constructed for the purpose of planting a single row of seeds. With this intention I make perforations in several rows around a planting-cylinder, which holes are to vary in size and number according to the nature of the seed to be planted. Above this cylinder I place a hopper for containing the seed, which hopper is so formed and arranged as to be capable of being slid along from end to end of the planting-cylinder, so that the opening on its lower side, through which the seed is to pass into the cavities or excavations in the planting-cylinder may be made to stand directly over either of the rows. The excavations in the planting-cylinder may be made in any form preferred; but they will in most cases be made round, their capacities not requiring to be varied, as was the case in my original machine, the mode of doing which required that they should be rectangular.

In the accompanying drawings, A A is the frame of the machine; B, a ground wheel or roller, from which motion may be communicated to the planting-cylinder C, there being a whirl on the axis of the ground-roller B and on that of the planting-cylinder C to receive a band for that purpose. In the actual machine these whirls and their connecting-band are on the side of the machine, (not shown in the drawings;) but this device is familiarly known, and does not need description.

*a a a* may represent a row of small cavities around the cylinder, such cavities being placed near together for the purpose of sowing or planting the seeds at short distances from each other. *b b* may represent two cavities or excavations of a larger size, forming another row around the cylinder, and standing for most purposes at a greater distance apart than those marked *a a*. One of a row still larger is shown at *d*, and it will be manifest that any number of such rows may be employed which can be contained within the length of the cylinder and which are far enough apart to be separately embraced by the opening in the bottom of the hopper.

D is the hopper, which is furnished with ledges near its lower side, which are received and slide within openings or slots *e e* in the frame of the machine above the planting-cylinder, thus allowing it to slide from end to end thereof and to be brought over either of the rows of excavations. The seeds are carried toward the back of the roller and fall into and slide down a trough E E, which at its upper end is as wide as the roller and narrows down at its lower, where it is received, and delivers the seed into the hollow at the back of the share or tooth F. There are covering-scrapers G on each side of the machine, serving to close the earth over the seeds, which are also pressed down by the roller B.

H is a guide-wheel placed on one side in front of the machine. The manner of placing this wheel on one side, as shown in the drawings, is productive of great practical advantage, as it admits of the tilting of the machine as to make a difference of two or three inches in the depth of the furrow.

I I are handles by which the machine is held and guided and by which also it may be tilted for the purpose above named.

In some planting or sowing machines planting-cylinders have been made with shifting slides having cavities of different sizes in them. Such a cylinder with shifting slides *d d* is shown in Fig. 4 in the drawings accompanying my original specification. In such a cylinder, when made of the ordinary size, it is not convenient to put more than four such slides, and it becomes necessary, therefore, to give a more rapid motion to the cylinder than is compatible with the equal distribution of the seed, as the quantity passing into the cavities will not be regular unless the motion of the cylinder is slow. By means of my cylinder the excavations in the respective rows may be as numerous as their size and a proper partition between them will allow, and the motion given to the cylinder will be proportionately slow.

Having thus fully described the nature of my improvement in my planting-machine, what I claim therein, and desire to secure by Letters Patent, is—

1. The manner in which I have formed and combined the planting-cylinder and hopper, as above set forth—that is to say, a cylinder having several rows of cavities or excavations around its periphery with a hopper placed above it and made capable of sliding along it, substantially in the manner and for the purpose set forth above.

2. The manner of placing the guide-whee H in front and in one side of the machine so as to allow of its being readily tilted to cause the share to make a furrow of greater or less depth.

JOSEPH GIBBONS.

Witnesses:
THOS. P. JONES,
E. B. BIGELOW.